United States Patent [19]

Mizuhara

[11] 4,426,033

[45] Jan. 17, 1984

[54] DUCTILE TITANIUM-COPPER BRAZING ALLOY

[75] Inventor: Howard Mizuhara, Hillsborough, Calif.

[73] Assignee: GTE Products Corporation, Stamford, Conn.

[21] Appl. No.: 420,072

[22] Filed: Sep. 20, 1982

[51] Int. Cl.³ .......................... B23K 35/30; C22C 9/00
[52] U.S. Cl. ........................................ 228/56; 228/122; 420/470; 420/488; 420/492; 420/493; 420/496; 428/606
[58] Field of Search ............... 420/492, 470, 490, 488, 420/496, 493; 148/411, 412, 414, 432, 433, 435; 228/56 R, 122, 263.11; 428/606

[56] References Cited

U.S. PATENT DOCUMENTS 1,991,162  2/1935  Kroll ................................. 148/411
3,948,432  4/1976  Pryor et al. ..................... 228/263.11
3,993,479  11/1976 Cheskis et al. ...................... 148/432
4,340,650  7/1982  Pattanaik et al. ................. 228/56 R
4,357,299  11/1982 Pattanaik ............................ 420/493

FOREIGN PATENT DOCUMENTS 2712994  8/1978  Fed. Rep. of Germany ........ 228/56
54-46122  4/1979  Japan .................................. 420/492
 512142  8/1939  United Kingdom ............... 420/492
 866456  4/1961  United Kingdom ............... 420/488
 567574  8/1977  U.S.S.R. ............................. 228/122

Primary Examiner—Peter K. Skiff
Attorney, Agent, or Firm—Donald R. Castle

[57] ABSTRACT

Reactive metal-copper alloys containing specified amounts of a third metal selected from the group consisting of silicon, tin, germanium, manganese, nickel, cobalt and mixtures thereof are suitable for brazing ceramics, other non-metallic and metallic materials.

14 Claims, No Drawings

DUCTILE TITANIUM-COPPER BRAZING ALLOY

FIELD OF INVENTION

This invention relates to brazing alloys. More particularly it relates to low temperature brazing aloys containing titanium.

BACKGROUND

An alloy sold under the tradename of Ticusil by the Wesgo Division of GTE Products Corporation, Belmont, Calif. contains 4.5% by weight of titanium, 68.8% by weight of silver and 26.7% by weight of copper. This alloy, while having the ability to wet various ceramic materials and has a relatively low brazing temperature, is not ductile and can not be rolled to a foil in a satisfactory manner and upon brazing contains a brittle dispersed phase.

Other titanium containing alloys containing higher amounts titanium are known to wet ceramics but they are brittle. These can be made into a flexible foil form by rapid solidification techniques, however, upon brazing it will form a brittle alloy joint.

When brazing brittle ceramic to metal components with different coefficients of thermal expansion, the reliability of brazed joint is highly dependent on the brazing alloy ductility, because the ductile alloy will minimize the stress between two different materials. Brittle alloy used for brazing brittle notch sensitive ceramic to metal, the ceramic almost always fails after being exposed to few thermal cycles.

SUMMARY OF THE INVENTION

Reactive metal-copper alloys containing specified amounts of copper and a reactive metal and controlled amounts of silicon, tin, germanium, manganese, nickel, cobalt and mixtures thereof have liquidus temperatures in the range of from about 870° C. to about 1170° C. are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

Within the context of this application the term "reactive metal" means titanium, vanadium, zirconium and mixtures thereof.

The amount of the reactive metal in a reactive metal-copper alloy, containing a third metal selected from Si, Sn, Ge, Mn, Ni, Co and mixtures thereof can not appreciably exceed 5% by weight and achieve a ductile material which upon brazing is free of dispersed phases.

When vanadium or zirconium or mixtures thereof are used as the reactive metal, the material is not ductile as when titanium is the reactive metal. The presence of brittle dispersed phases relates to the level of the reactive metal and is dependent on the degree of solubility of particular reactive metal with alloying metal. Titanium is the preferred reactive metal with copper based alloys due to higher addition without the formation of brittle phase when compared to Zr or V.

In many brazing applications it is desired to utilize an intermediate brazing temperature, that is the liquidus of the alloy should be in about the range of from about 870° C. to about 1170° C.

While the liquidus temperature is in the ranges specified, the flow temperature, that is the temperature at which the alloys of this invention flow and wet the materials to be brazed is important in utilizing the materials using conventional brazing techniques. If the materials to be brazed can withstand about 1300° C., it is preferred to utilize the lowest brazing temperatures that meets the application temperature. The flow temperatures for the products of this invention generally range from about 910° C. to about 1200° C.

The amount of reactive metal in the alloys is from about 0.25% by weight to about 5% by weight with from about 1.0% by weight to about 3% by weight being preferred.

The third metal in the reactive metal-copper system is selected from silicon, tin, germanium, manganese, nickel, cobalt and mixtures thereof and will be present in amounts of from about 1% by weight to about 45% by weight, however, the amount of copper will be varied within the range of from about 50% by weight to about 98.75% so that the liquidus temperature of the alloy is within the range of from about 870° C. to about 1170° C. Silicon, when used as the third metal, is generally varied from about 1% by weight to about 6% by weight with a range of from about 2% to about 4% by weight being preferred. When tin is the third metal, it is generally used in amounts of from about 1% to about 10% by weight with from about 4% to about 8% by weight being preferred. When manganese is the third metal, it is generally used in the amount from about 5% to about 45% by weight with 20% to 45% by weight of manganese being preferred. When nickel or cobalt is the third metal, the amounts used are generally used in the amount from about 2% to about 45% by weight with 10% to 20% by weight of nickel being preferred and about 5% to about 15% of cobalt being preferred. In any event the alloys of this invention have a liquidus temperature of from about 870° C. to about 1170° C.

A preferred alloy is a copper based alloy containing the foregoing amounts of reactive metals and from about 20% to 40% manganese and about 5% to about 12% by weight of nickel or cobalt.

To more fully illustrate the subject invention the following detailed examples are presented. All parts, percentages and proportions are by weight unless otherwise indicated.

EXAMPLE 1

An alloy containing about 1% titanium, about 6% tin and about 93% copper is prepared by conventional powder metallurgy techniques. A foil having a thickness of about 6 mils is prepared. When placed between two pieces of 97% alumina and brazed at about 1100° C. at $10^{-5}$ mm Hg for about 10 minutes, a suitable brazed joint is formed.

EXAMPLE 2

Following the procedure given in Example 1, an alloy containing about 1% titanium, about 4% silicon and about 95% copper is prepared in the form of a foil. The foil having a thickness of about 6 mils is suitable for brazing 5 mil thick Kovar to alumina using a brazing temperature of about 1070° C. at $10^{-5}$ mm Hg pressure and a time of about 10 minutes.

EXAMPLE 3

An alloy of about 10% by weight Ge and about 88% by weight Cu and about 2% by weight titanium, is cast and rolled down to about 4 mil thickness sheet. This alloy with a liquidus/solidus of about 990° C./890° C. is rolled down to 4 mil thickness with intermediate vacuum anneal and is placed between two 97% alumina pieces measuring $\frac{3}{4}'' \times 1'' \times 30$ mil thickness, and heated to about 1050° C. in about $10^{-5}$ mm Hg vacuum. The alloy melts and brazes the ceramics together in a satisfactory manner.

EXAMPLE 4

An alloy containing about 2% titanium, about 40% manganese and about 58% copper is cast and rolled down to about 10 mil foil. The brazing foil is placed between cemented tungsten carbide and 4340 steel and heated to about 1100° C. under about $10^{-5}$ mm Hg vacuum. The brazed joint is sound and requires shear force of about 25,000 psi to break the brazed joint.

EXAMPLE 5

An alloy containing about 3% titanium, about 37% manganese, about 9.5% nickel and about 50.5% copper is melted and cast into a copper mold. The ingot is rolled down to about 20 mil foil with intermediate anneal. The alloy is cut and place between a cemented tungsten carbide and 4340 steel and vacuum brazed in about $10^{-5}$ mm Hg vacuum at about 1100° C. The resulting brazed joint requires 40,000 psi to shear off the tungsten carbide from the steel member.

EXAMPLE 6

An alloy containing about 3% titanium, about 31% manganese, about 10% cobalt and about 56 copper is melted in vacuum and cast into a copper mold. The ingot is rolled down to 3.0 mil thickness sheet and cut into a $\frac{1}{2}'' \times \frac{1}{2}''$ square. The brazed alloy is placed between a alumina block $\frac{1}{2}'' \times \frac{1}{2}'' \times \frac{1}{4}''$ and Kovar 10 mil sheet. The alloy melts and flows at 1075° C. in $10^{-5}$ mm Hg vacuum and wets both alumina and Kovar.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article consisting essentially of a ductile brazing alloy foil, said alloy having a composition consistng essentially of from about 0.25% to about 5% by weight of a reactive metal, selected from the group consisting of titanium, vanadium, zirconium and mixtures thereof, from about 50% by weight to about 98.75% by weight of copper and from about 1% to about 45% by weight of a third metal selected from the group consisting of silicon, tin, germainium, manganese, nickel, cobalt and mixtures thereof wherein said alloy has a liquidus temperature of from about 870° C. to about 1170° C.

2. An article according to claim 1 wherein said reactive metal is titanium.

3. An article according to claim 2 wherein said third metal is tin in an amount of from about 1% to about 10% by weight.

4. An article according to claim 2 wherein said third metal is silicon in an amount of from about 1% to about 6% by weight.

5. An article according to claim 4 wherein said silicon is present in an amount of from about 2% by weight to about 4% by weight.

6. An article according to claim 2 wherein said third metal is nickel and is present in an amount of from about 2% to about 45% by weight.

7. An article according to claim 2 wherein said third metal is cobalt and is present in an amount of from about 2% to about 45% by weight.

8. An article according to claim 6 wherein nickel is present in an amount of from about 10% to about 20% by weight.

9. An article according to claim 7 wherein cobalt is present in amounts of from about 5% to about 15% by weight.

10. An article according to claim 2 wherein said third metal is manganese and is present in an amount of from about 5% to about 45% by weight.

11. An article according to claim 10 wherein manganese is present in an amount of from about 20% by weight to about 40% by weight.

12. An article according to claim 11 wherein said alloy has cobalt or nickel present in an amount of from about 5% to about 12% by weight.

13. A brazing alloy consisting essentially of from 0.25% to about 5% of titanium, from about 1% to about 10% by weight of tin, balance copper, said alloy having a liquidus temperature of from about 870° C. to about 1170° C.

14. A brazing alloy consisting essentially of from 0.25% to about 5% by weight of titanium, from about 20% to about 40% manganese, from about 5% to about 12% by weight of cobalt or nickel, and from about 50% to about 74.75% by weight of copper.

* * * * *